United States Patent [19]

Dahanayake et al.

[11] Patent Number: 5,843,317
[45] Date of Patent: *Dec. 1, 1998

[54] RECOVERY AND REUSE OF ANIONIC SURFACTANTS FROM AQUEOUS SOLUTIONS

[75] Inventors: Manilal S. Dahanayake, Princeton Junction; Mark E. Ventura, Freehold; Alwyn Nartey, Plainsboro, all of N.J.

[73] Assignee: Rhodia Inc., Cranbury, N.J.

[ * ] Notice: The term of this patent shall not extend beyond the expiration date of Pat. No. 5,654,480.

[21] Appl. No.: 806,349

[22] Filed: Feb. 26, 1997

[51] Int. Cl.$^6$ .................................................. B01D 61/00
[52] U.S. Cl. ........................... 210/651; 210/653; 134/10; 134/13
[58] Field of Search .................................... 210/651, 652, 210/653; 134/10, 110, 13

[56] References Cited

U.S. PATENT DOCUMENTS

| | | | |
|---|---|---|---|
| 4,111,812 | 9/1978 | Baddour | 210/259 |
| 4,293,428 | 10/1981 | Gale et al. | 252/8.55 |
| 4,892,660 | 1/1990 | Sweet et al. | 210/651 |
| 5,205,937 | 4/1993 | Bhave et al. | 210/651 |
| 5,501,741 | 3/1996 | McMahon | 210/651 |
| 5,654,480 | 8/1997 | Danahanayake et al. | 564/292 |

*Primary Examiner*—Ana Fortuna
*Attorney, Agent, or Firm*—John A. Shedden; Craig M. Bell

[57] ABSTRACT

Improved surfactant recovery upon ultrafiltration of a surfactant-containing aqueous solution can be obtained using a system comprising anionic surfactants.

18 Claims, No Drawings

RECOVERY AND REUSE OF ANIONIC SURFACTANTS FROM AQUEOUS SOLUTIONS

BACKGROUND OF THE INVENTION

This invention relates to the unexpected discovery of surfactants which demonstrate improved surfactant recovery from aqueous solution upon ultrafiltration.

Because of environmental and economic concerns, it is important to remove and, desirably, recover for reuse active ingredients from aqueous by-product or waste solutions. Recovery and recycling not only reduces or eliminates the discharge of contaminated water into the environment but can also reduce the overall cost of industrial processes. This is of particular importance in processing aqueous solutions containing surfactants as they can be a costly component of the solution.

Ultrafiltration equipment can be used to overcome certain waste disposal problems in connection with aqueous solutions, whether using polymeric or sintered metal/sintered metal oxide filters. However, the economics of these processes in recovering surfactants have been seriously hampered for many of the conventional surfactants are not easily transferred to the permeate. Therefore, the ability to recycle and reuse surfactants recovered from aqueous solutions is significantly reduced, and back addition of surfactant is necessary to bring the surfactant in the aqueous solution to the original level. This is a significant problem in the area of recycling as full economics cannot be achieved.

Nonionic systems have been disclosed in U.S. Pat. No. 5,205,937 that claim significant recovery of water-based cleaning systems in the permeate upon ultrafiltration of waste solutions, though expressions of dissatisfaction have been heard concerning the filterability and recovery of the water-based cleaning formulations currently being utilized commercially.

The present invention is directed to the finding that surfactant-containing aqueous compositions containing a certain group of surfactants unexpectedly provide improved surfactant recovery in the permeate after ultrafiltration.

SUMMARY OF THE INVENTION

It has unexpectedly been found that increased surfactant recovery can be obtained via an ultrafiltration process by the use of aqueous solutions containing certain anionic surfactant systems which, when ultrafiltered, realize a permeate characterized by increased surfactant concentrations.

The present invention also provides a process for the filtration of contaminants from an aqueous anionic surfactant-containing solution by passing a feed solution containing the contaminants through an ultrafiltration membrane, preferably a metal oxide membrane on a ceramic support.

In another aspect, the present invention relates to a process for separating a surfactant from an aqueous surfactant solution containing contaminants, such as oils, greases, waxes, emulsified lubricants, and the like by ultrafiltering, that is, by passing the solution through a multichannelled sintered monolithic metal/metal oxide ultrafiltration membrane on a ceramic support to recover the surfactant in the permeate. The sintered membrane has a nominal pore size in the range of about 50 to 1000 Angstroms.

DETAILED DESCRIPTION OF THE INVENTION

The present invention provides an efficient and effective composition and process for separating surfactants from aqueous solutions for recycling and reuse. It has unexpectedly been found that the compositions of this invention, containing anionic surfactants, are adapted for substantial recovery upon ultrafiltration. The surfactants which have been found to provide the benefits of this invention include the following, which can be represented by the formulae:

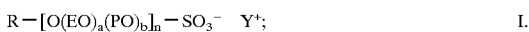

$R-[O(EO)_a(PO)_b]_n-SO_3^-\ Y^+;$      I.

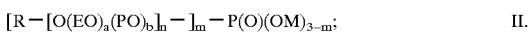

$[R-[O(EO)_a(PO)_b]_n-]_m-P(O)(OM)_{3-m};$      II.

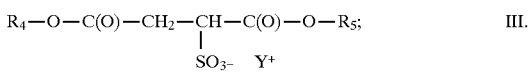

$R_4-O-C(O)-CH_2-CH-C(O)-O-R_5;$      III.
$\quad\quad\quad\quad\quad\quad\quad\quad |$
$\quad\quad\quad\quad\quad\quad\quad SO_3^-\ Y^+$

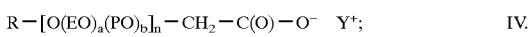

$R-[O(EO)_a(PO)_b]_n-CH_2-C(O)-O^-\ Y^+;$      IV.

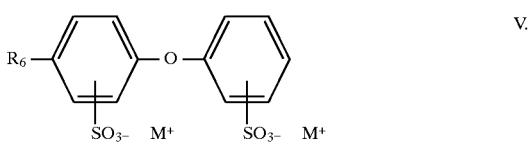

V.

and mixtures thereof; wherein

R is selected from the group consisting of alkyl, aryl, alkaryl, alkylarylalkyl, arylalkyl, alkylamidoalkyl, alkylaminoalkyl and $R_1-C(O)-[O(EO)_a(PO)_b]_n-R_2-(O)_p-$ wherein $R_1$ is $C_{12}-C_{22}$ alkyl and $R_2$ is $C_1-C_{18}$ alkylene and the hydroxy substituted derivatives thereof; wherein the alkyl group contains from about 1 to about 12 carbon atoms, the aryl group represents a phenyl, diphenyl, diphenylether, or naphthalene moiety and wherein the total carbon atom content of the R group is no more than about 18 carbon atoms. R is preferably $C_4$ to $C_{10}$ alkyl or alkylamidoalkyl. R can be illustrated by butyl, hexyl, 2-ethylhexyl, octyl, nonyl, decyl, and the like. Substituents from natural sources containing mixed carbon chain lengths can be used or purified to reduce the number of chain lengths in the alkyl groups. Preferred alkylamidoalkyls are butylamidoethyl, octylamidopropyl, and decylamidopropyl.

M represents hydrogen, an alkali metal such as sodium or potassium, or $-[R_3-[(EO)_a(PO)_b(BO)_c]_n-O-]_q-P(O)(OM)_2$.

Y represents a counterion, preferably an alkali metal, and more preferably sodium; EO represents ethyleneoxy radicals, PO represents propyleneoxy radicals, BO represents butoxy radicals, a, b, and c are independently numbers of from 0 to 50, a is preferably from about 0 to about 15, b is preferably from about 0 to 10, and c is preferably 0 to 10, wherein the EO, PO, and BO radicals can be randomly mixed or in discrete blocks;

n is 0 or 1;

m is 1 and/or 2 giving either a mono or diphosphate ester or mixtures thereof;

p is 0 or 1;

$R_3$ is $C_1-C_5$ alkylene;

$R_4$ is $C_4-C_8$ alkyl or $C_4-C_8$ alkylamido;

$R_5$ is $C_4-C_8$ alkyl or Y;

$R_6$ is hydrogen or $C_4-C_{12}$ alkyl; and q is 1 to about 10.

Preferably, the surfactants are low or non-foaming as foaming may create difficulties in filtering. The anionic compounds of Formula I.–V. are well known compounds and can be made by standard, art recognized methods.

This group of surfactants can typically be incorporated in aqueous solutions that have high acid or alkaline content, particularly having a relatively high alkali content, for example, within the range of from 0.01 to about 50%, and preferably from about 0.1 to about 40% sodium or potassium hydroxide or equivalent such as sodium carbonate, silicate, phosphate, and amine solutions.

The ultrafilterable surfactant solutions of this present invention have a surfactant content in an amount effective for the requisite end-use application, for example, cleaning and, ultimately, the ultrafiltration process. The primary anionic surfactants can comprise up to 100% of the total weight of the surfactant actives. Preferably, the primary anionic surfactants of this invention are used in combination with other zwitterionic, amphoteric, anionic, and/or cationic surfactants to achieve optimum surfactant characteristics in the final end-use formulation. Since a preferred goal of this invention is the formation of a recyclable surfactant cleaning composition, the alternate surfactants are preferably also separable from the cleaning solution waste stream by ultrafiltration.

Typically, aqueous surfactant-containing solutions in the final use area have total active surfactant concentrations from about 0.001 to about 99; preferably from about 0.01 to about 40; most preferably 0.01 to about 15 active percent by weight based on the total weight of the solution. Of this total active surfactant composition, the primary anionic compounds of this invention comprise up to about 100% and preferably from about 5 to about 100% active weight of the total active surfactants in the aqueous solutions.

When the primary anionic surfactants are used in combination with amphoteric or zwitterionic surfactants, which are the preferred secondary surfactants, the amphoteric or zwitterionic surfactants can comprise up to about 95% of the surfactant blend.

The preferred amphoterics to be combined with the anionics of this invention are those such as the sultaines and betaines and true amphoterics such as amphoacetates and amine oxides as disclosed in U.S. Pat. No. 4,891,159 and co-pending U.S. patent application Ser. No. 08/445,244 filed May 19, 1995, both of which are incorporated herein by reference.

The more preferred amphoterics to be used in this invention are the sultaines depicted by the formula:

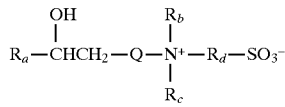

wherein $R_a$ is alkyl, aryl, alkylaryl wherein the alkyl group is $C_4$–$C_{18}$, or alkoxymethylene, wherein the alkoxy group is $C_4$–$C_8$;

$R_b$ and $R_c$ each independently is $C_1$–$C_6$ alkyl and hydroxy derivatives thereof, —(EO)$_a$(PO)$_b$OH wherein EO represents ethyleneoxy radical, PO represents a propyleneoxy radical, a and b are each independently 0 to 20 wherein a plus b do not exceed about 20, and the ethoxy or propoxy groups can be randomly distributed or in blocks in the polymer chain; or $R_b$ and $R_c$ can jointly be —CH$_2$CH$_2$OCH$_2$CH$_2$— or —CH$_2$CH$_2$SCH$_2$CH$_2$— so as to form together with the nitrogen atom a morpholine or thiomorpholine ring.

$R_d$ is $C_1$–$C_4$ alkylene or hydroxy substituted alkylene, preferably $C_1$–$C_2$, Q is a covalent bond or

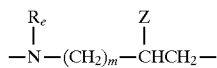

wherein $R_e$ is hydrogen or —CH$_2$CH(OH)CH$_2$SO$_3$M wherein M is hydrogen or an alkali metal such as sodium or potassium, and m is 0 or 1, Z is hydrogen or an electron-donating group such as OH, SH, CH$_3$O, or CH$_3$S.

Typically, the $R_a$ group contains from about 4 to about 12, commonly from bout 4 to about 8 carbon atoms. Preferably $R_a$ is alkoxymethyl containing from about 4 to about 8 carbon atoms in the alkoxy group such as butoxymethyl, hexyloxymethyl, 2-ethylhexyloxymethyl and the like. $R_b$ and $R_c$ are each preferably methyl, hydroxyethyl, 2-hydroxypropyl, or a morpholine ring. When Q is not a covalent bond, Z is preferably hydrogen and m is preferably 1. Q is preferably a covalent bond.

The most preferred amphoteric surfactants are the alkylether hydroxy propyl sultaines, specifically those selected from the group consisting of:

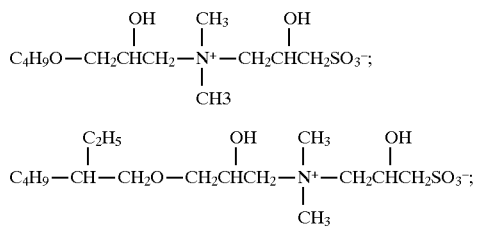

and mixtures thereof.

The surfactant-containing solutions of this invention, in addition to the surfactants described hereinbefore, can contain other materials such as silicates, phosphates, pyrophosphates and polyphosphates for example, in the form of the sodium salts. Other additives that may be present include lower alcohols of 1–6 carbons, glycols, glycol ethers, chelating agents, thickeners such as amides, cellulose derivatives, anti-foaming agents, builders, sequestering agents/buffers, and polyacrylates. In some cases, additional amphoteric, zwitterionic, nonionic or cationic surface active agents including corrosion inhibitors and hydrotropes can also be present.

The solutions of the present invention are filtered, preferably using a polymeric, ceramic or metal/metal oxide sintered filter on a ceramic backing. For example, an ultrafiltration membrane system can include a feed tank and a separation membrane unit that is composed of a metal oxide membrane, e.g., titanium or zirconium oxide, optionally with a yttrium oxide stabilizer, on a ceramic carrier, e.g., alpha-alumina with or without titanium dioxide having 1 or more channels on a monolithic support. The flux can be maintained at acceptable levels to allow soils to be concentrated in the retentate with minimal fouling through extended operating times while passing the surfactant-containing solution through the filter to be recovered in the permeate for recycling and reuse. While an effective pore size is easily determinable by a skilled artisan, nominal pore sizes of from about 50 to less than about 1,000 Angstroms and preferably less than about 500 Angstroms can be used. Rate of filtering can vary depending on filter pore size, pressure, temperature and the like.

As used herein, the term "contaminants" may include, either singly or in mixtures, oils used in metal stamping, forming, bending, grinding, drilling, machining, and polishing; low to medium molecular weight hydrocarbons; paraffinic oils; waxes; petrolatum; non-chlorinated high viscosity hydrocarbons; chlorinated and sulfurized hydrocarbons; mineral oils; and vegetable oils. Also included in this term are materials which are partially soluble in the aqueous solution or which form stable micro-emulsions in water such as polyethylene and polypropylene glycol, oil-surfactant blends, water-soluble cutting fluids, machining coolants, unsaturated mono -, di-, and triglycerides, animal fats, fatty acids, and esters. Included in the term "contaminants" are insoluble solids such as extremely fine structural material particles; inorganic, inert, or elemental solid particles; and metal oxide particles not dissolved by the particular surfactant-containing aqueous solution.

The present invention will be further illustrated in the examples which follow:

EXAMPLE I

Filterable surfactants are evaluated against a commercially available composition by comparing the concentration of surfactant in solution at pH 12 before and after passing through a KERASEP (sold by Tech Sep). ultrafiltration membrane filter. Two gallons of surfactant solution of an activity as stated in the tables is prepared and charged into the working tank of the filtration unit. The working tank solution is heated and maintained at 52°+/−2° C. during the operation. The working tank solution is circulated through the membrane. The inlet pressure is adjusted to 20 psi. The retentate and permeate are looped back to the working tank so that the concentration of working tank solution is constant. Sample solutions are collected from the permeate and working tank at set time intervals. The percentage of surfactants permeated is expressed as the ratio of permeate weight percent active concentration to working tank weight percent active concentration. The surfactant concentrations are determined by surface tension measurement techniques.

TABLE 1

PERCENTAGE OF SURFACTANT I PASSING THROUGH THE MEMBRANE
[Initial conc.(Ci) = 0.25% active, pH = 12, 0.1 um pore size]

| Min | Concentrate of Permeate (Cp) (wt % active) | Cp/Ci(%) |
|---|---|---|
| 5 | 0.193 | 77.2 |
| 30 | 0.180 | 72.0 |
| 60 | 0.218 | 87.2 |
| 120 | 0.195 | 74.0 |
| 240 | 0.162 | 64.8 |

SURFACTANT I is sodium butoxyethoxy acetate (MIRANATE ® B sold by Rhône-Poulenc)

TABLE 2

PERCENTAGE OF SURFACTANT II PASSING THROUGH THE MEMBRANE
[Initial conc.(Ci) = 0.25% active, pH = 12, 0.1 um pore size]

| Min | Concentrate of Permeate (Cp) (wt % active) | Cp/Ci(%) |
|---|---|---|
| 5 | 0.186 | 74.4 |
| 30 | 0.190 | 76.0 |
| 60 | 0.158 | 63.2 |
| 120 | 0.251 | 100.0 |
| 240 | 0.126 | 50.4 |

SURFACTANT II is phenol ethoxylate (6 moles), phosphate ester (RHODAFAC ® BP-769 sold by Rhône-Poulenc)

TABLE 3

PERCENTAGE OF SURFACTANT III PASSING THROUGH THE MEMBRANE
[Initial conc.(Ci) = 0.25% active, pH = 12, 0.1 um pore size]

| Min | Concentrate of Permeate (Cp) (wt % active) | Cp/Ci(%) |
|---|---|---|
| 5 | 0.190 | 76.0 |
| 30 | 0.256 | 102.4 |
| 60 | 0.233 | 93.2 |
| 120 | 0.218 | 87.2 |
| 240 | 0.203 | 81.2 |

SURFACTANT III is sodium 2-ethylhexyl phosphate (RHODAFAC ® PEH sold by Rhône-Poulenc).

TABLE 4

PERCENTAGE OF BRULIN 63G PASSING THROUGH THE MEMBRANE
[Initial conc.(Ci) = 3% Brulin 63G*, pH = 'as is' active, 0.1 um pore size]

| Min | Concentrate of Permeate (Cp) (wt % active) | Cp/Ci(%) |
|---|---|---|
| 5 | 0.316 | 10.5 |
| 30 | 0.309 | 10.3 |
| 60 | 0.302 | 10.1 |
| 120 | 0.288 | 9.6 |
| 240 | 0.251 | 8.4 |

*Brulin 63G is a trademark of Brulin for a blend of sodium xylene sulfonate, potassium phosphate, sodium silicate and two nonionic surfactants (mol. wt. about 2750 and about 910 respectively) having an alcoholic portion of about $C_{10}$ and about 50 moles of EO/PO (about 32 mol. EO/18 mol. PO randomly distributed).

TABLE 5

PERCENTAGE OF AQUATEK RP2000 PASSING THROUGH THE MEMBRANE
[Initial conc.(Ci) = 0.25% active*, pH = 12, 0.1 um pore size]

| Min | Concentrate of Permeate (CP) (wt % active) | Cp/Ci(%) |
|---|---|---|
| 5 | 0.030 | 12.0 |
| 30 | 0.028 | 11.2 |
| 60 | 0.025 | 10.0 |
| 120 | 0.021 | 8.4 |
| 240 | 0.020 | 8.4 |

*Aquatek RP2000 is the trademark for a surfactant formulation sold by Rhône-Poulenc wherein the surfactant present in the formulation is a Dodecyl Tertiary Thioethoxylate (7) (nonionic) surfactant As can be seen from the data in Tables 1, 2 and 3, a large proportion, generally between about 60% and as high as about 100% of the surfactant compositions of the invention, passes through the ultrafiltration membrane and is captured in the permeate. The data in Tables 1, 2, and 3 demonstrate that the permeate of an aqueous solution containing a surfactant of this invention can be effectively recycled for reuse. This high recovery of the surfactant also reduces the pressure on the environment that would otherwise occur without such a high surfactant recovery.

In contrast, the data in Table 4 shows that only a small amount of surfactant from a commercially available, aqueous surfactant-containing solution passes through the ultrafiltration membrane and becomes part of the permeate. The working solution was prepared as before using a sufficient amount of the commercial solution to provide an initial concentration (calculated) of about 3% with an "as is" pH.

The data in Table 4 demonstrates that with the nonionic Brulin 63G aqueous solution, most of the surfactant remains in the retentate and less than 10.5% passes through the ultrafilter with the permeate.

Table 5 further illustrates the difficulty encountered when one attempts to pass certain nonionic surfactant through ultrafiltration membranes. Working solutions were prepared as before and the concentration of the nonionic surfactant in the permeate measured. As the data indicates, most of the surfactant remains in the retentate and less than 12.0% passes through the ultrafilter with the permeate.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of recovering at least 95% of a substantially pure anionic surfactant from an aqueous surfactant-containing solution for reuse comprising the steps of:
    (i) preparing an aqueous solution comprising a surfactant composition comprising an anionic surfactant
    (ii) ultrafiltering the aqueous surfactant-containing solution at a pressure no more than 45 psi to generate a permeate; and
    (iii) recovering surfactant from the permeate.

2. The method of claim 1 wherein said aqueous solution comprises from about 0.001 to about 99 active weight percent of said surfactant composition.

3. The method of claim 2 wherein R is $C_4$ to $C_{10}$ alkyl or alkylamidoalkyl; and
Y is sodium.

4. The method of claim 1 wherein said aqueous solution comprises from about 0.01 to about 40 active weight percent of said surfactant composition.

5. The method of claim 1 wherein the aqueous solution further comprises up to 95 weight percent active of an anionic surfactant; the weight percent being based on the total active surfactant composition weight.

6. The method of claim 1 wherein the aqueous solution comprises up to 95 weight percent active of an amphoteric surfactant; the weight percent being based on the total active surfactant composition weight.

7. The method of claim 6 wherein the amphoteric surfactant is selected from the group consisting of sultaine, betaine, and mixtures thereof.

8. The method of claim 1 wherein the aqueous solution comprises up to 95 weight percent active, based on the total active surfactant weight, of an amphoteric surfactant of the formula:

$$R_a-\overset{OH}{\underset{}{C}}HCH_2-Q-\overset{R_b}{\underset{R_c}{N^+}}-R_d-SO_3^-$$

wherein
$R_a$ is alkyl, aryl, alkylaryl wherein the alkyl group is $C_4$–$C_{18}$, or alkoxymethylene wherein the alkoxy group is $C_4$–$C_8$,
$R_b$ and $R_c$ each independently is i) $C_1$–$C_6$ alkyl or hydroxy derivatives thereof, ii) —$(EO)_a(PO)_bOH$ wherein EO represents an ethyleneoxy radical and PO represents a propyleneoxy radical, a and b are each independently 0 to 20, with the proviso that a plus b cannot exceed 20, and the EO and PO radicals can be randomly mixed or in discrete blocks, or jointly with the nitrogen, can form a morpholine or thiomorpholine ring,
$R_d$ is $C_1$–$C_4$ alkylene or hydroxy substituted derivatives thereof,
Q is a covalent band or $$-N(R_e)-(CH_2)_m-\overset{Z}{\underset{}{C}}HCH_2-,$$

wherein $R_e$ is hydrogen or —$CH_2CH(OH)CH_2SO_3M$
wherein M is hydrogen or an alkali metal,
m is 0 or 1, and
Z is hydrogen or an electron donating group.

9. The method of claim 8 wherein the amphoteric surfactant is selected from the group consisting of:

$$C_4H_9O-CH_2CHCH_2-\overset{OH}{\underset{}{}}\overset{CH_3}{\underset{CH_3}{N^+}}-CH_2CHCH_2-SO_3^-;$$

$$C_4H_9-\overset{C_2H_5}{\underset{}{C}}H-CH_2O-CH_2CHCH_2-\overset{OH}{\underset{}{}}\overset{CH_3}{\underset{CH_3}{N^+}}-CH_2CHCH_2-SO_3^-;$$

and mixtures thereof.

10. The method of claim 1 wherein the anionic surfactant is selected from the group consisting of a sodium butoxy-ethoxy acetate, a phenyl ethoxylate phosphate ester, and a sodium 2-ethylhexyl phosphate.

11. The method of claim 1 wherein the ultrafiltering is accomplished using a membrane having nominal pore sizes of less than about 1,000 Angstroms.

12. The method of claim 11 wherein said membrane is selected from the group consisting of polymeric membranes, ceramic membranes, and metal oxide membranes on a ceramic carrier.

13. A method of recovering at least 95% of a substantially pure anionic surfactant from an aqueous surfactant-containing solution for reuse comprising the steps of:
    (i) preparing an aqueous solution comprising a surfactant composition comprising surfactant selected from the group consisting of:

$$R-[O(EO)_a(PO)_b]_n-SO_3^- \quad Y^+, \qquad \text{I.}$$

$$[R-[O(EO)_a(PO)_b]_n-]_m-P(O)(OM)_{3-m}, \qquad \text{II.}$$

$$R_4-O-C(O)-CH_2-\underset{SO_3^- \ Y^+}{CH}-C(O)-O-R_5, \qquad \text{III.}$$

$$R-[O(EO)_a(PO)_b]_n-CH_2-C(O)-O^- \quad Y^+ \qquad \text{IV.}$$

V.

$$R_6-\bigcirc-O-\bigcirc$$
$$SO_3^- \ M^+ \quad SO_3^- \ M^+$$

and mixtures thereof, wherein
R is selected from the group consisting of alkyl, aryl, alkaryl, alkylarylalkyl, aryalkyl, alkylamidoalkyl, alkylaminoalkyl, $R_1$—$C(O)$—$[O(EO)_a(PO)_b]_n$—

$R_2-(O)_p-$ and the hydroxy-substituted derivatives thereof wherein the alkyl groups contain from 1 to about 12 carbon atoms, the aryl group is a phenyl, diphenyl, diphenylether, or naphthalene moiety, with the proviso that the total number of carbon atoms in any R group is no more than 18, $R_1$ is $C_{12}-C_{22}$ alkyl,
$R_2$ is $C_1-C_{15}$ alkylene,
$R_4$ is $C_4-C_8$ alkyl or $C_4-C_8$ alkylamido,
$R_5$ is $C_4-C_8$ alkyl or Y
$R_6$ is hydrogen or $C_4-C_{12}$ alkyl,
M is hydrogen, alkali metal or $$-[R_3-[EO)_n(PO)_b(BO)_c]_n-O]_q-P(O)(OM)_2,$$

$R_3$ is $C_1-C_5$ alkylene,
Y is a counterion,
EO represents an ethyleneoxy radical, PO represents a propyleneoxy radical, and BO represents a butoxy radical,
a, b, and c each are independently 0 to 50, wherein the EO. PO, and BO can be randomly mixed or in discrete blocks,
n is 0 or 1,
m is 1 and/or 2,
p is 0 or 1;
q is 1 to about 10;
ii) ultrafiltering the aqueous surfactant-containing solution at a pressure of no greater than 45 psi to generate a permeate; and
iii) recovering surfactant from the permeate
EO represents an ethyleneoxy radical, PO represents a propyleneoxy radical, and BO represents a butoxy radical,
a, b, and c each are independently 0 to 50, wherein the EO, PO, and BO can be randomly mixed or in discrete blocks,
n is 0 or 1,
p is 0 or 1, and
ii) ultrafiltering the aqueous surfactant-containing solution to generate a permeate and
iii) recovering surfactant from the permeate.

14. A method of recovering at least 95% of a substantially pure anionic surfactant from an aqueous surfactant-containing solution for reuse comprising the steps of:
   i) preparing an aqueous solution comprising a surfactant composition comprising surfactant of the formula:

$$[R-[O(EO)_a(PO)_b]_n-SO_3^{-Y+}$$

wherein R is selected from the group consisting of alkyl, aryl, alkaryl, alkylarylalkyl, aryalkyl, alkylamidoalkyl, alkylaminoalkyl, $R_1-C(O)-[O(EO)_a(PO)_b]_n-R_2-(O)_p-$ and the hydroxy substituted derivatives thereof wherein the alkyl groups contain from 1 to about 12 carbon atoms, the aryl group is a phenyl, diphenyl diphenylether; or naphthalene moiety, with the proviso that the total number of carbon atoms in any R group is no more than 18,
   $R_1$ is $C_{12}-C_{22}$ alkyl,
   $R_2$ is $C_1-C_{18}$ alkylene,
   Y is a counterion,
   EO represents an ethyleneoxy radical, PO represents a propyleneoxy radical, and BO represents a butoxy radical,
   a, b, and c each are independently 0 to 50, wherein the EO, PO, and BO can be randomly mixed or in discrete blocks,
   n is 0 or 17
   p is 0 or 1, and
   ii) ultrafiltering the aqueous surfactant-containing solution at a pressure of no greater than 45 psi to generate a permeate; and
   iii) recovering surfactant from the permeate.

15. A method of recovering at least 95% of a substantially pure anionic surfactant from an aqueous surfactant-containing solution for reuse comprising the steps of:
   i) preparing an aqueous solution comprising a surfactant composition comprising surfactant of the formula:

$$[R-[O(EO)_a(PO)_b]_n-]_m-P(O)(OM)_2$$

wherein R is selected from the group consisting of alkyl, aryl, alkaryl, alkylarylalkyl, aryalkyl, alkylamidoalkyl, alkylaminoalkyl, $R_1-C(O)-[O(EO)_a(PO)_b]_n-R_2-(O)_p-$ and the hydroxy substituted derivatives thereof wherein alkyl groups contain from 1 to about 12 carbon atoms, the aryl group is a phenyl, diphenyl, diphenylether, or naphthalene moiety, with the proviso that the total number of carbon atoms in any R group is no more than 18,
   $R_1$ is $C_{12}-C_{22}$ alkyl,
   $R_2$ is $C_1-C_{18}$ alkylene, and
   M is hydrogen, alkali metal or $$-R_3-[EO)_a(PO)_b(BO)_c]_n-O]_q-P(O)(OM)_2,$$

$R_3$ is $C_1-C_5$ alkylene,
   EO represents an ethyleneoxy radical, PO represents a propyleneoxy radical, and BO represents a butoxy radical,
   a, b, and c each are independently 0 to 50, wherein the EO, PO, and BO can be randomly mixed or in discrete blocks,
   n is 0 or 1;
   m is 1 and/or 2,
   p is 0 or 1, and
   q is 1 to about 10;
   ii) ultrafiltering the aqueous surfactant-containing solution at a pressure of no more than 45 psi to generate a permeate; and
   iii) recovering surfactant from the permeate.

16. A method of recovering at least 95% of a substantially pure anionic surfactant from an aqueous surfactant-containing solution for reuse comprising the steps of:
   i) preparing an aqueous solution comprising a surfactant composition comprising surfactant of the formula:

$$R_4-O-C(O)-CH_2-CH-C(O)-O-R_5,$$
   $$|$$
   $$SO_3^-\ Y^+$$

wherein
   $R_5$ is $C_4-C_8$ alkyl or $C_4-C_8$ alkylamido,
   $R_5$ is $C_4-C_8$ alkyl or Y, and
   Y is a counterion;
   ii) ultrafiltering the aqueous surfactant-containing solution at a pressure of no more than 45 psi to generate a permeate; and
   iii) recovering surfactant from the permeate.

17. A method of recovering at least 95% of a substantially pure anionic surfactant from an aqueous surfactant-containing solution for reuse comprising the steps of:

i) preparing an aqueous solution comprising a surfactant composition comprising surfactant of the formula:

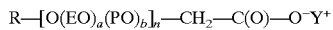

wherein
R is selected from the group consisting of alkyl, aryl, alkaryl, alkylarylalkyl, aryalkyl, alkylamidoalkyl, alkylaminoalkyl, $R_1$—C(O)—[O(EO)$_a$(PO)$_b$]$_n$—$R_2$—$R_2$—(O)$_p$— and the hydroxy substituted derivatives thereof wherein the alkyl groups contain from 1 to about 12 carbon atoms, the aryl group is a phenyl, diphenyl, diphenylether, or naphthalene moiety, with the proviso that the total number of carbon atoms in any R group is no more than 18,
$R_1$ is $C_{12}$–$C_{22}$ alkyl,
$R_2$ is $C_1$–$C_{18}$ alkylene, and
Y is a counterion,
EO represents an ethyleneoxy radical, PO represents a propyleneoxy radical, and BO represents a butoxy radical,
a, b, and c each are independently 0 to 50, wherein the EO, PO, and BO can be randomly mixed or in discrete blocks,
n is 0 or 1;
ii) ultrafiltering the aqueous surfactant-containing solution at a pressure of no more than 45 psi to generate a permeate and
iii) recovering surfactant from the permeate.

18. A method of recovering at least 95% of a substantially pure anionic surfactant from an aqueous surfactant-containing solution for reuse comprising the steps of:

i) preparing an aqueous solution comprising surfactant of the formula:

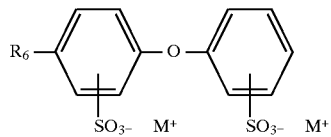

wherein
$R_6$ is hydrogen or $C_4$–$C_{12}$ alkyl, and
M is hydrogen, alkali metal, or

wherein $R_3$ is $C_1$–$C_5$ alkylene,
EO represents an ethyleneoxy radical, PO represents a propyleneoxy radical, and BO represents a butoxy radical,
a, b, and c each are independently 0 to 50, wherein the EO, PO, and BO can be randomly mixed or in discrete blocks,
n is 0 or 1; and
q is 1 to about 10,
ii) ultrafiltering the aqueous surfactant-containing solution at a pressure of no more than 45 psi to generate a permeate; and
iii) recovering surfactant from the permeate.

* * * * *